Aug. 14, 1962   H. C. STEVENS, JR   3,048,865
POWER DRIVEN BRUSHING UNIT FOR WASHING TRUCKS
Filed Nov. 21, 1958   3 Sheets-Sheet 1
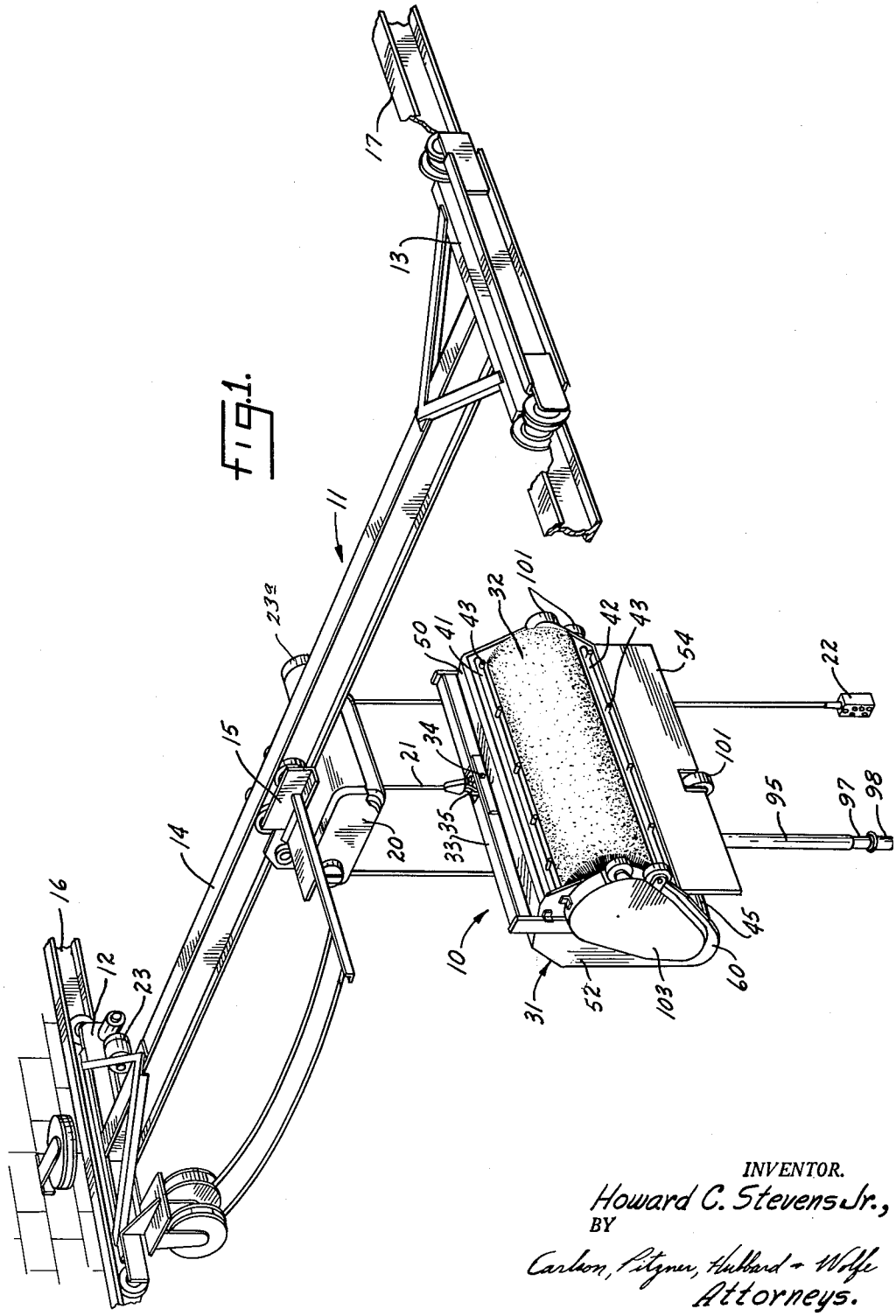
INVENTOR.
Howard C. Stevens Jr.,
BY
Carlson, Pitzner, Hubbard & Wolfe
Attorneys.

Aug. 14, 1962   H. C. STEVENS, JR   3,048,865
POWER DRIVEN BRUSHING UNIT FOR WASHING TRUCKS
Filed Nov. 21, 1958   3 Sheets-Sheet 2
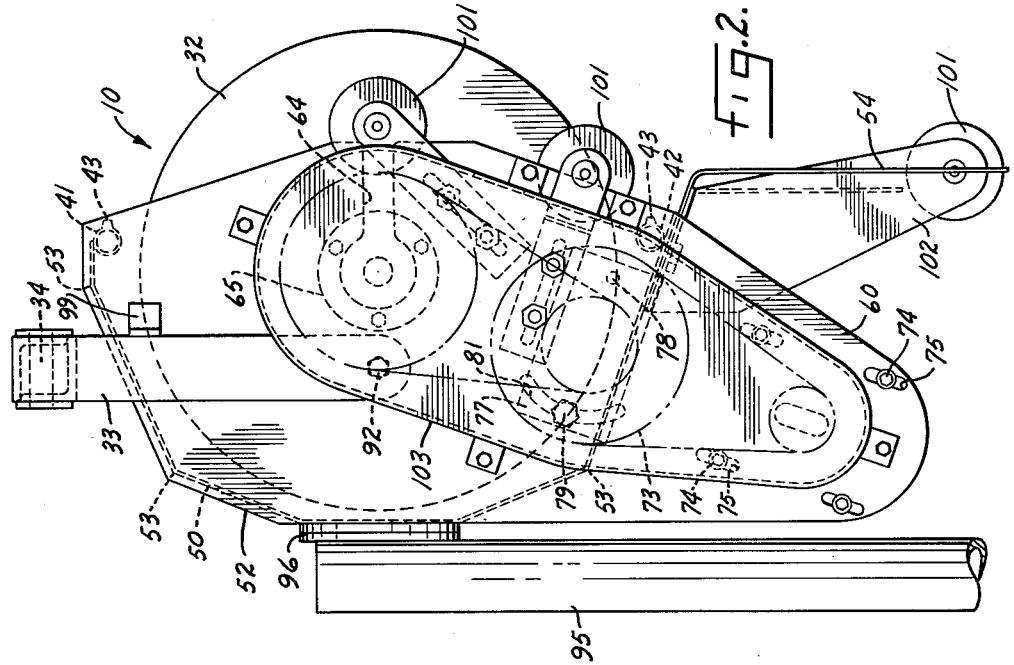
INVENTOR.
Howard C. Stevens Jr.,
BY
Carlson, Pityner, Hubbard + Wolfe
Attorneys.

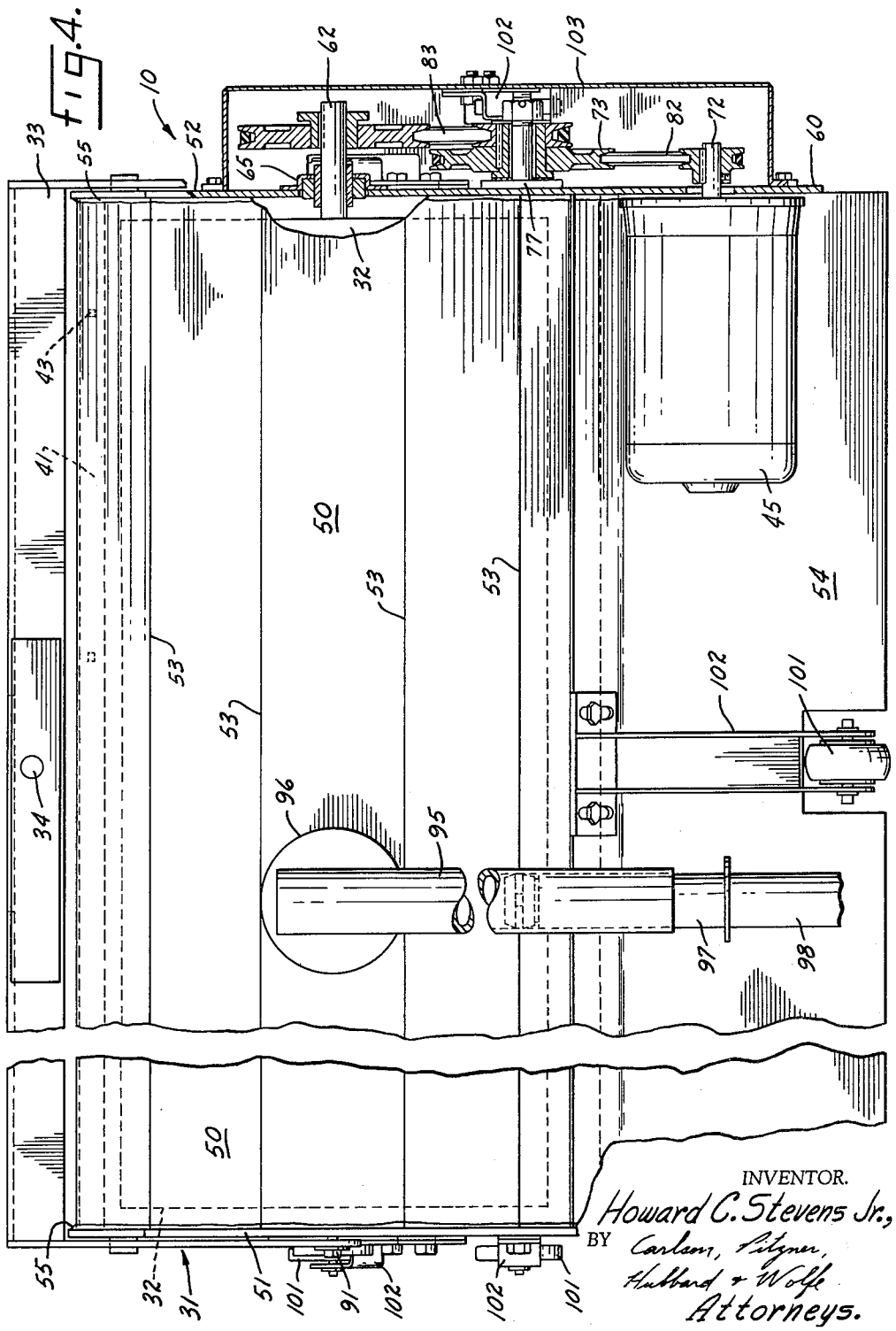

United States Patent Office 3,048,865
Patented Aug. 14, 1962

3,048,865
POWER DRIVEN BRUSHING UNIT FOR
WASHING TRUCKS
Howard C. Stevens, Jr., Muskegon, Mich., assignor to Manning, Maxwell & Moore, Incorporated, Muskegon, Mich., a corporation of New Jersey
Filed Nov. 21, 1958, Ser. No. 775,608
3 Claims. (Cl. 15—21)

This invention relates to washing and cleaning devices and concerns more particularly an apparatus for washing large trucks and similar bulky objects.

Washing assemblies including power driven brushes and water spray devices have been built for large scale, heavy duty washing tasks, such as the regular cleaning of large trucks and trailers. Because of the weight and bulk of such assemblies, it has been proposed to carry them on overhead traveling cranes which can maneuver the washing units during use.

A washing unit of this type is somewhat specialized in nature and thus, to be commercially acceptable, it must be as inexpensive and trouble-free as possible.

Accordingly, it is the primary aim of the invention to provide a novel truck washer unit that is efficient and sturdy, as well as exceptionally economical to construct.

It is also an object of the invention to provide a novel truck washer unit of the above type that is unusually light so as not to impose a heavy load on its supporting crane structure.

It is a further object to provide a truck washer unit as characterized above, which despite being light and economical to construct, is strong and rigid so as to have a long, trouble-free life under heavy-duty service conditions.

With more particularity, it is another object to provide a novel drive motor mounting for a truck washer unit of the type described above which is simple, inexpensive, and quite easy to adjust and service.

Other objects and advantages of the invention will become apparent upon reading the following detailed description and upon reference to the drawings in which:

FIGURE 1 is a perspective view looking down on a truck washer unit embodying the present invention supported by a traveling crane structure;

FIG. 2 is an enlarged side elevation of the washer unit shown in FIG. 1;

FIG. 3 is an enlarged elevation of the opposite side of the washer unit shown in FIG. 1; and FIG. 4 is a fragmentary rear view of the washer unit shown in FIG. 1 and with certain parts being illustrated in section.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Turning first to FIG. 1, there is shown a truck washer unit 10 embodying the invention suspended in operating position from an overhead crane structure 11. The crane structure illustrated includes a pair of opposite end trucks 12 and 13 joined by a cross girder 14, on which is supported a carriage 15. The end trucks 12 and 13 ride, respectively, on fixed parallel I-beam tracks 16 and 17 which define the path of travel for the crane structure 11. The carriage 15 is adapted to ride back and forth along the cross girder 14 between the end trucks 12 and 13.

Directly supporting the washing unit 10 is a hoist assembly 20 which is secured to the carriage 15. The hoist assembly includes a cable 21 that suspends the washer unit and a control box 22 which permits an operator to raise and lower the washer unit by paying out or drawing in the supporting cable 21.

Preferably, motor drive units 23 are provided for the end trucks 12 and 13, and a similar drive unit 23a is provided for the carriage 15, with the controls for all of the drive units being located at the control box 22. In this way, the washer operator has central control of the power driven movement of the crane structure 11 along the parallel tracks 16, 17, of the movement of the carriage 15 along the cross girder 14, and of the up-and-down movement of the washer unit 10 on the hoist assembly 20.

Turning to the washer unit itself, the unit 10 includes a frame 31 in which is journaled a cylindrical washing brush 32. A bail 33 is secured to the frame 31 and provides a pin 34 that receives a hook 35 secured to the end of the hoist cable 21 so as to suspend the unit 10.

To provide a cleansing water spray, upper and lower banks of spray bars 41, 42 having forwardly directed nozzles 43, are secured in the frame 31 at the top and the bottom of the washing brush 32. Water is carried to the spray bars 41, 42 in any convenient manner, such as by placing a hose, not shown, in communication with the ends of the spray bars.

To co-operate with the streams of water from the nozzles 43 during a washing operation, the washing brush 32 is rotatably driven by an electric motor 45 (see FIGS. 1 and 4). It will be appreciated that the combined rinsing and scrubbing action afforded by the spray bars 41, 42 and the brush 32, respectively, makes the washer unit 10 an extremely effective cleaning unit when it is maneuvered against the side surfaces of a large trailer truck or like vehicle.

Pursuant to the invention, the washer unit frame 31 is made up of a one-piece shroud plate 50 and a pair of end plates 51, 52 arranged to shield and rigidly support the washing brush, its driving mechanism, and the other components of the unit 10. In the preferred embodiment, the plate 50 is folded on a plurality of parallel lines 53 to define an open-ended, generally semi-cylindrical shroud, and is also provided with a skirt portion 54 which extends downwardly from the lower straight edge of the shroud plate. The pair of end plates 51, 52 are formed slightly larger than the opposite open ends of the shroud plate so that the end plates extend outwardly around the semi-cylindrical body of the plate 50 (see FIGS. 2 and 3). This permits fillet welds 55 to be easily formed between the end plates and the shroud plate so that these parts can be conveniently and economically joined to form a very rigid frame structure.

Preferably, the skirt portion 54 is a sheet of flexible rubber and has sufficient stiffness to serve as splash protection while being able to yield around projections on the surface being washed.

In order to mount the motor 45, the end plate 52 is provided with a downwardly extending tail portion 60, and the motor is secured directly to the inner surface of the tail portion. It will be noted that the motor is thus placed in a shielded position lying in the angle between the outer surface of the shroud plate 50 and the back of its skirt portion 54. The motor is therefore not subject to splashing when the washer unit is in operation.

For carrying the rotatable brush 32 within the frame 31, the brush is mounted on an axle shaft 62 whose opposite ends are slipped within forwardly facing slots 63, 64 formed in the end plates 51, 52, respectively. The ends of the axle 62 are journaled in bearing assemblies 65 which are bolted directly to the outer surfaces of their respective end plates.

In keeping with the invention, the motor 45 is drivingly coupled to the brush 32 through a speed reducing belt drive which includes an idler pulley, and the parts are arranged so that all of the belts in the drive can be easily and uniformly tensioned. To this end, the outer end of the brush axle shaft 62 and the end of the motor drive shaft 72 both extend through the end plate 52 to the latter's outer side (see FIG. 4). A double pulley assembly 73 is also journaled on the outer side of the end plate 52, and serves as a speed reducing connection between the motor 45 and the axle shaft 62.

Both the double pulley 73 and the motor 45 are shiftably mounted and releasably secured to the end plate 52. The motor is secured to the end plate by four bolts 74 (see FIG. 2), which pass through parallel slots 75 so that the bolts can be loosened and the motor shifted with respect to the brush axle shaft 62. The double pulley 73 is journaled on a rectangular plate 77 (see FIG. 2), which is pivoted at 78 and locked in place by a bolt 79 that passes through an arcuate slot 81 formed in the end plate 52. It can thus be seen that by loosening the bolts 74 and 79, both the motor 45 and the double pulley 73 can be shifted on the end plate 52.

Coupling the motor driving shaft 72 and the brush axle shaft 62 are a pair of driving belts 82, 83 which extend from the double pulley 73 to properly sized pulleys on the shaft 62, 72 so as to provide a driving connection having the desired speed reducing ratio.

It may therefore be appreciated that by loosening the bolts 74 and 79, the motor 45 can be shifted with respect to the brush axle shaft 62 so that the driving belts 82, 83 are each properly tensioned. In this way, the double pulley 73 is automatically properly positioned between the motor shaft 72 and the brush axle shaft 62. When the belts 82, 83 have been properly tensioned, the bolts 74, 79 are tightened to complete the adjustment of the brush driving mechanism.

In order to tilt the washing unit into proper contact with sloping surfaces, the bail 33 is pivoted at 91 and 92 to the end plates 51, 52, respectively, so that the frame 31 may tilt freely within the bail. To control this tilting movement, a handle 95 is secured at 96 directly to the rear surface of the shroud plate 50. Preferably, the handle 95 is telescoping and has a lower rod portion 97, having a hand grip, that is slidably received in the upper tubular portion of the handle (see FIG. 4). In this way, the operator may conveniently hold the grip 98 and, as the unit 10 is raised and lowered by the hoist 20 against the side of a truck body, the rod 97 will slide in and out of the handle 95 to give the operator control of the unit in all of its vertical positions.

In order to normally hold the washer unit upright, the center of gravity of the relatively heavy motor 45 is positioned behind the swinging axis of the unit, defined by the bail pivots 91, 92 (see FIGS. 2 and 3), and stops 99 are secured to the outer surfaces of the end plates 51, 52. The weight of the motor 45 swings the unit about the bail pivot points 91, 92 until the stops 99 engage the bail 33. It may be noted that the motor 45 is only slightly "off-center" with respect to the pivots 91, 92 so that little effort is required of the operator to tilt the washing unit into the proper washing position.

In order to prevent the washer unit from inadvertently striking and marring the surface which it is operating against, a plurality of buffer rollers 101 are journaled on brackets 102 and are adjustably secured to the end plates 51, 52 and the shroud 50. The rollers 101 are positioned slightly forward of the two end plates 51, 52 and just in front of the shroud skirt portion 54 so that these parts cannot be inadvertently swung into contact with the surface being washed.

To enclose and shield the brush driving mechanism, a cup-like cover 103 is fitted on the outer side of the end plate 52 so as to enclose the driving belts 82, 83 and their associated pulleys.

It may now be seen that, through the use of the single shroud plate construction described above, an unusually light, strong and rigid washer unit frame has been provided. Those skilled in the art will also appreciate that this construction is quite economical, as is the simple and effective motor-mounting and belt-driving system previously described.

I claim as my invention:

1. In a power driven washer unit, the combination comprising, a one piece, generally semi-cylindrical shroud plate having opposite open ends, a pair of end plates, said end plates being respectively secured directly to said shroud plate across the opposite ends thereof a cylindrical washing brush journaled on and between said end plates so as to partially extend from the enclosing shroud plate, said shroud plate having a skirt portion extending at an angle from one of the straight edges of the generally semi-cylindrical shroud plate in a direction away from said brush, one of said end plates have an integral tail portion extending alongside of said skirt portion at an angle thereto, and a motor mounted on said tail portion so as to lie in the angle between the outer surface of said shroud plate and its skirt portion, said motor being drivingly coupled to said brush.

2. In a power driven washer unit, the combination comprising, a one piece, generally semi-cylindrical shroud plate having opposite open ends, a pair of end plates, said end plates being slightly larger than said open ends and being disposed across the opposite ends of the shroud plate so as to slightly overlap the plate, said end plates being fillet welded to the outside of the shroud plate, a cylindrical washing brush journaled on and between said end plates so as to partially extend from the enclosing shroud plate, said shroud plate having a skirt portion extending at an angle from one of the straight edges of the generally semi-cylindrical shroud plate in a direction away from said brush, one of said end plates having an integral tail portion extending alongside of said skirt portion at an angle thereto, a motor mounted on said tail portion so as to lie in the angle between the outer surface of said shroud plate and its skirt portion, said motor having a drive shaft extending through said tail portion to the outer side of the end plate, said brush having an axle also extending through the end plate having said tail portion, and means coupling said drive shaft and said brush axle for rotating said brush.

3. In a power driven washer unit, the combination comprising, a one piece, generally semi-cylindrical shroud plate having opposite open ends, a pair of end plates, said end plates being respectively secured directly to said shroud plate across the opposite ends thereof, a bail pivoted to said end plates and swingably supporting the unit with the lower edge of said shroud plate lying in a generally horizontal plane, a cylindrical washing brush journaled on and between said end plates so as to partially extend from the enclosing shroud plate, spray means mounted on said shroud plate so as to direct a water spray outwardly adjacent said brush, said shroud plate having a skirt portion extending down from the lower edge of the generally semi-cylindrical shroud plate, one of said end plates having an integral tail portion extending alongside of said skirt portion at an angle thereto, a motor mounted on said tail portion so as to lie in the angle between the outer surface of said shroud plate and its skirt portion, said motor being drivingly coupled to said brush, and a handle secured to the back of said shroud plate and extending downwardly for controlling the swinging movement of the unit.

References Cited in the file of this patent

UNITED STATES PATENTS

| | | |
|---|---|---|
| 2,238,757 | Stevason | Apr. 15, 1941 |
| 2,636,198 | Wilson | Apr. 28, 1953 |
| 2,650,506 | Montgomery | Sept. 1, 1953 |
| 2,804,635 | Wilson | Sept. 3, 1957 |
| 2,854,680 | Wilson | Oct. 7, 1958 |
| 2,912,871 | Velkoff | Nov. 17, 1959 |